United States Patent [19]

Taber et al.

[11] Patent Number: 4,610,621

[45] Date of Patent: Sep. 9, 1986

[54] MOLD FOR CLOSURE CAP

[75] Inventors: James M. Taber; Stephen J. Kras, both of Chicago, Ill.

[73] Assignee: Continental White Cap, Inc., Northbrook, Ill.

[21] Appl. No.: 675,798

[22] Filed: Nov. 28, 1984

[51] Int. Cl.[4] .......................... B29C 33/44; B29D 1/00
[52] U.S. Cl. .................................... 425/577; 425/443; 425/DIG. 58; 249/59; 249/63; 249/66 R
[58] Field of Search ............... 425/556, 577, 588, 443, 425/DIG. 58, 809; 249/59, 63, 64, 66 R

[56] References Cited

U.S. PATENT DOCUMENTS

| | | | |
|---|---|---|---|
| 2,558,027 | 6/1951 | Wilson | 425/556 |
| 3,341,897 | 9/1967 | Susuki | 249/63 |
| 3,537,676 | 11/1970 | Miller | 249/59 |
| 3,555,606 | 1/1971 | Hedgewick | 425/556 |
| 3,679,339 | 7/1972 | Tucker | 425/556 |
| 3,718,419 | 2/1973 | Adams | 249/59 |
| 3,776,676 | 12/1973 | Kessler | 425/556 |
| 3,850,350 | 11/1974 | Towns et al. | 222/556 |
| 3,904,165 | 9/1975 | Den Boer | 249/67 |
| 3,926,401 | 12/1975 | Northrup | 249/59 |
| 4,019,711 | 4/1977 | Altenhof et al. | 249/59 |
| 4,280,976 | 7/1981 | von Holdt | 425/438 |
| 4,340,352 | 7/1982 | Hayberg | 249/59 |
| 4,421,705 | 12/1983 | Hatakeyama et al. | 264/153 |

Primary Examiner—Jay H. Woo
Assistant Examiner—James C. Housel
Attorney, Agent, or Firm—Charles E. Brown

[57] ABSTRACT

This relates to a mold for forming closure caps and like cap-like members having a peripheral body with internal threads. The mold is constructed to have an irregular parting line with the result that a major part of the body of the closure cap may be externally defined by that mold member which is moved to an out-of-the-way position when the mold is opened, leaving the injection molded closure cap body free for radial expansion and thus permissible stripping of the closure cap from the core about which it is molded. This construction eliminates the customary ejector sleeve and permits the base mold member to function as an ejector block for directly stripping the molded closure cap from the core. This construction permits mating tapered surfaces on the base mold member and the core which form a seal and do not have relative sliding contact, thereby eliminating previous undesired wear surfaces. This abstract forms no part of the specification of this application and is not to be construed as limiting the claims of the application.

7 Claims, 5 Drawing Figures

MOLD FOR CLOSURE CAP

This invention relates in general to new and useful improvements in mold constructions and more particularly to a mold wherein a closure cap having internal threads may be readily stripped from an associated core.

In the past, closure caps with internal threads have been primarily formed within a cavity formed within a mold member around a core. There has also been disposed between the core and that mold member an ejector sleeve. When the closure cap is to be removed from the core, it is necessary that there be relative movement first of both the core and the ejector sleeve to move the molded closure cap out of the mold member and then further movement of the ejector sleeve relative to the core to strip the closure cap from the core. This results in undesirable wear surfaces on opposite faces of the ejector sleeve and on the core and the mold member.

In accordance with this invention, it is proposed to form a mold wherein the mold member which receives the core from the bottom edge of the cavity and the cavity is primarily formed in a second mold member into which the upper end of the core projects. The second mold member has an irregular parting line with the first mentioned mold member, with the first mentioned mold member forming only a portion of the periphery of the cavity. Further, the closure cap is modified so that it has no threads along that portion of the cavity which is defined by the first mentioned mold member. Thus, when the mold is opened, the second mold member moves away from the molded closure cap externally to release that portion of the closure cap body having internal threads formed thereon so that the molded closure cap is immediately ready to be stripped from the core and the stripping may be effected by the first mentioned mold member also functioning as an ejector block and being movable relative to the core.

Another feature of the invention is that by eliminating the ejector sleeve the core and the mold member in which it is positioned may have separable mating tapered surfaces which move away from one another, but return to seal the interface between the core and the mold member.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
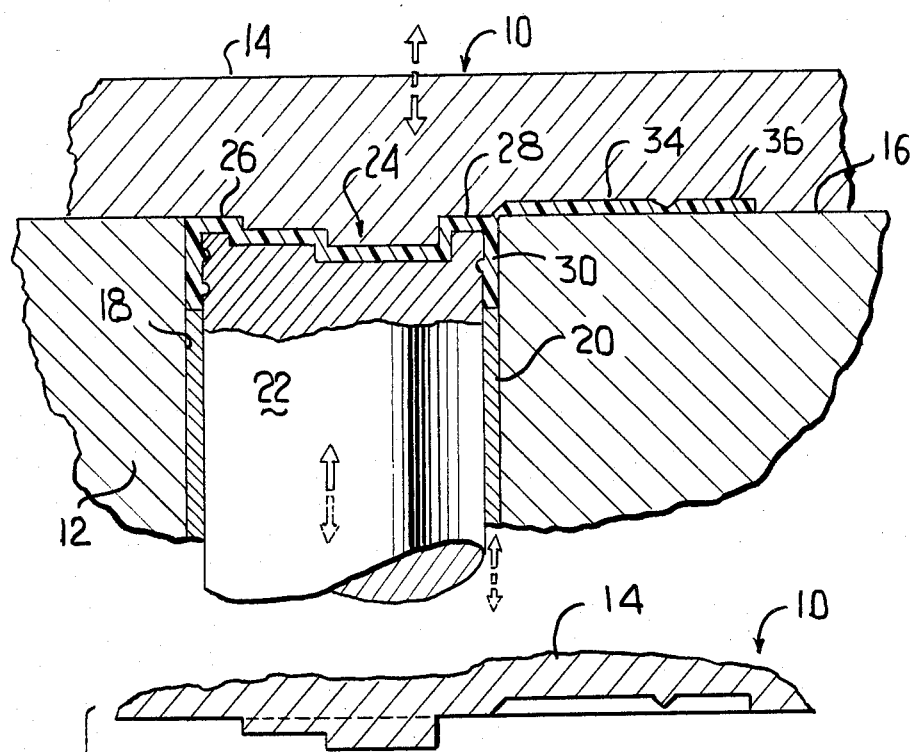
FIG. 1 is a schematic sectional view taken through a prior art mold, showing the relationship of the mold components including an ejector sleeve.
Figure 2:
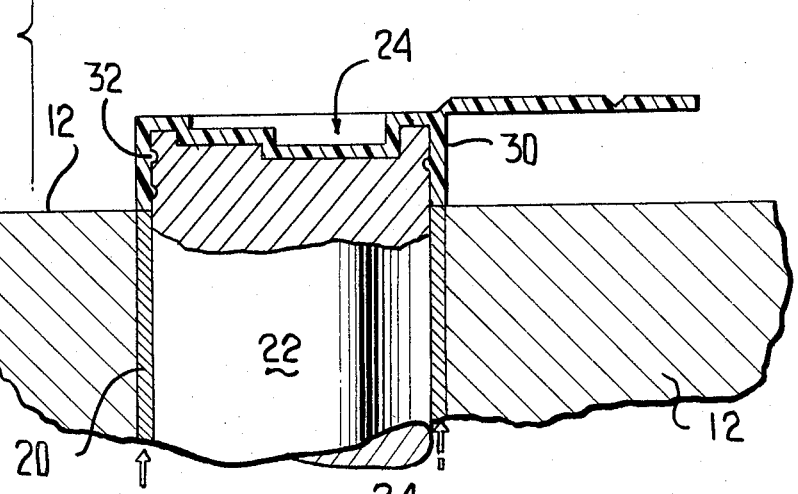
FIG. 2 is a schematic sectional view similar to FIG. 1, and shows the mold in its open state and the molded closure cap being stripped from the mold member in which the cavity is primarily formed.
Figure 3:
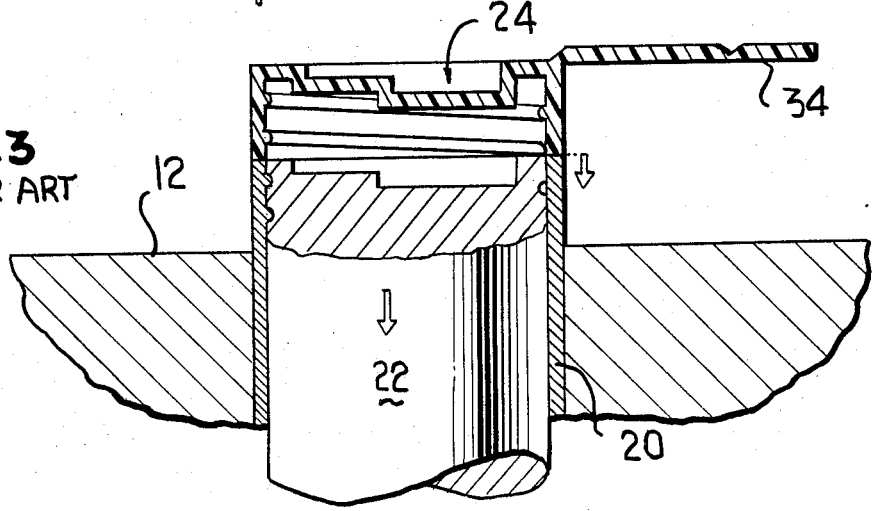
FIG. 3 is another schematic sectional view showing the molded closure cap being stripped from the core by moving the ejector sleeve axially with respect to the core.

Referring now to the drawings in detail, reference is first made to FIGS. 1-3 wherein there is illustrated a prior art mold generally identified by the numeral 10. The mold 10 includes a base mold member 12 and a closure mold member 14 having an inner face along a straight parting line 16. The base molding member 12 is provided with a bore 18 in which there is slidably positioned in sealing relation on ejector sleeve 20. The ejector sleeve 20 has slidably positioned therein in sealing relation a core 22.

The upper end of the core 22 is configurated to define the internal surface of a closure cap 24 which is to be injection molded of a plastic material within a cavity 26. The closure cap 26 may be of different configurations, but basically includes an end wall 28 having depending therefrom a cylindrical body 30 which is provided with at least one internal thread 32. The illustrated thread 32 extends entirely about the circumference of the interior of the body 30 and has overlapping end portions.

The cavity 26 is defined in part by the core 22, the ejector sleeve 20, the base mold member 12, and the second mold member 14. It will be seen that in addition to the core defining the internal configuration of the closure cap 24, the extreme end of the ejector sleeve defines the free end surface of the body 30 and the mold member 12 defines the external surface of the body 30. The mold member 14 defines the external configuration of the end wall 28.

Figure 4:
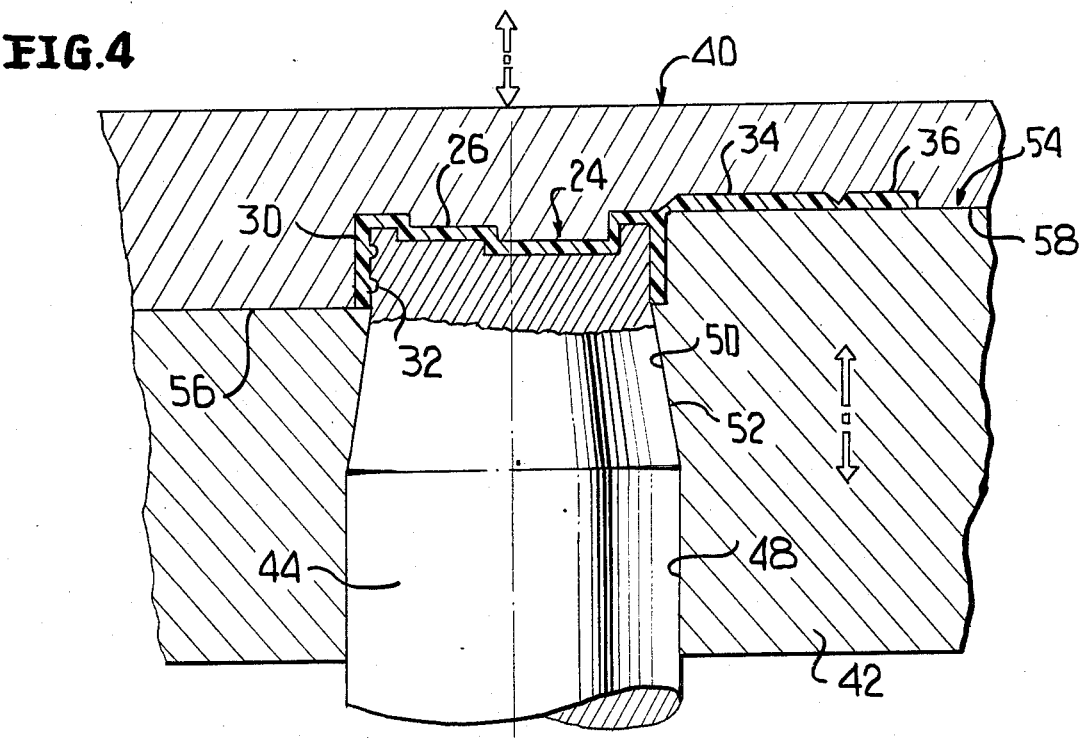
FIG. 4 is a schematic sectional view through a mold formed in accordance with this invention, and shows the details of the mold.

If desired, the closure cap 24 may be of a special configuration as is generally shown in FIG. 4 to be described hereinafter, and may be of the type which is specifically disclosed in the patent to Towns et al 3,850,350. If the closure cap 24 is of the type disclosed in the Towns et al patent, it will also have formed integrally therewith a closure panel 34 which will be formed within a cavity portion 36 disposed between and formed by the mold members 12 and 14.

As shown in FIG. 2, the mold 10 is opened by moving the mold member 14 away from the mold member 12. Then, there is relative movement between the core 22 and the ejector sleeve 20 on the one hand, and the mold member 12 on the other, so as to move the injection molded plastic material closure cap 24 entirely out of the mold member 12 to a position where the body 30 is free radially outwardly to expand as is required to strip the thread 32 from the core 22. Thereafter, the relative movement of the core 22 with respect to the mold member 12 is discontinued, as shown in FIG. 3, while relative movement between the ejector sleeve 20 and the core 22 continues fully to strip the closure cap 24 from the core as shown in FIG. 3, at which time the closure cap 24 is free of the mold.

As will be readily apparent, the outer surface of the ejector sleeve 20 must form a seal with the wall of the bore 18. In a like manner, the inner surface of the ejector sleeve 20 must form a seal with the exterior surface of the core. If not, the injected plastic material will enter in between the ejector sleeve 20 and the core on the one hand, and the mold member 12 on the other hand. However, these surfaces are subject to wear and when the fit is made initially tight enough to form the required seals, wear will result in the fit becoming loose and render the mold inoperative.

In accordance with this invention, the mold cavity 26 and the cavity extension 36 are slightly modified in a manner which will permit elimination of the ejector sleeve and which will permit the base mold member to function in a dual capacity as an ejector block.

Referring now to FIG. 4, it will be seen that the mold is generally identified by the numeral 40 and includes a base mold member 42, a core 44, and a second mold member 46. The base mold member 42 is provided with a bore 48 which has a radially inwardly tapered upper surface 50. The core 44 is seated in the bore 48 and is provided with an upper tapered surface 52 which mates with the surface 50 and in the fully closed position of the mold 40 provides for an automatic seal between the cores 44 and the base mold member 42.

It is to be noted that there is an irregular parting line 54 between the base mold member 42 and the second mold member 46. The parting line 54 includes a lower portion 56 on one side of the core 44 and and upper portion 58 on the opposite side of the core 44. The net result is that a major portion of the external surface of the closure cap body 30 is defined by the mold member 46 while the free end of the body 30 is defined by a portion of the mold member 42 immediately above the upper end of the tapered portion 50 of the bore 48 and along the lower parting line portion 56. The second mold member 46 also defines the external or upper surface of the wall 28 of the closure cap 24.

The closure panel 34 will be formed in the same manner as previously described, and the cavity 36 will be primarily formed in the mold member 46 in the manner described with respect to the mold 10, but along the parting line portion 58.

There will be one change in the closure cap 24. This change is an interruption of the thread 32 along a peripheral portion of the body 30 which has the external surface thereof defined by a small part of the cavity 26 which is formed by a portion of the mold member 42 which extends axially between the parting line portion 56 and the parting line portion 58.

Figure 5:
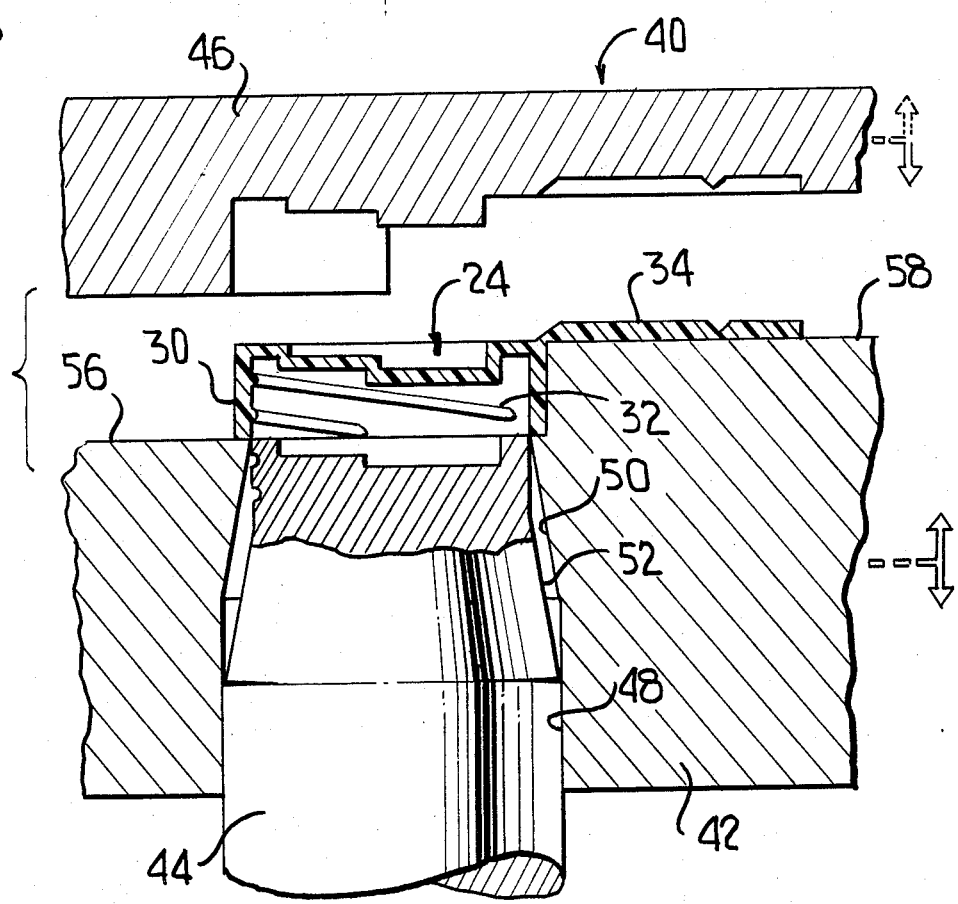
FIG. 5 is a schematic sectional view similar to FIG. 4, and shows the mold in its open state and the mold member which forms the ejector block having stripped the molded closure cap from the core.

Referring now to FIG. 5, it will be seen that the removal of the molded closure cap 24 may be simply effected by first opening the mold 40 through the displacement of the mold member 46 which now frees externally all of that portion of the closure cap body 30 which is provided internally with the thread 32. At this time, the closure cap 24 is ready to be stripped from the core. This is now effected by relative axial movement between the core 44 and the mold member 42 with a preferred embodiment of the invention moving the ejector block (mold member 42) relative to the core 44 so as to strip the closure cap from the upper end of the core 44. This is clearly shown in FIG. 5. The stripped closure cap 24 is now free to be removed from the mold 40.

It will be seen that the tapered surfaces 50, 52 form the sole required seal between the core 44 and the mold member 42. These surfaces come into contact with one another only when the core 44 seats relative to the mold member 42 as shown in FIG. 4. There is no problem of wear of the external surface of the core 44 with respect to the wall of the mold member 42 which defines the bore 48.

Thus, by eliminating an intermediate portion only of the thread 32, a highly efficient mold, free of undesirable wear surfaces, may be readily formed.

Although only a preferred embodiment of the mold has been specifically illustrated and described herein, it is to be understood that minor variations may be made in the mold and more particularly the closure cap defining cavity of the mold without departing from the spirit and scope of the invention as defined by the appended claims.

We claim:

1. A mold for forming by injection molding a closure cap including an end panel and a cylindrical body, said cylindrical body having a free end and an integral interrupted internal thread about a major portion of said body; said mold comprising a core for defining internal surfaces of the closure cap and including thread forming means for forming said integral thread, said core having an end and a circumferential portion free of thread forming means defining an interruption of the thread forming means, opposing first and second mold members having an irregular parting line, said first mold member having received therein said core for relative movement axially of said core, said core projecting above a portion of said parting line with said first mold member along said parting line portion defining said free end of the closure cap body, said first mold member also having one wall portion opposing that circumferential portion of said core free of thread forming means defining said interruption of the thread forming means aand further defining a part of an exterior wall of the closure cap body, and said second mold member having a wall opposing said core and forming the remainder of the exterior wall of the closure cap body and a wall opposing said core end to form the end panel of the closure cap; said first and second mold members being separable along said parting line to separate said second mold member from a molded cap to free that portion of a molded closure cap having an internal thread, and said first mold member thereafter being movable relative to said core to strip the molded closure cap from said core with the separation of the molded cap from the first mold member being automatic.

2. A mold according to claim 1 wherein said second mold member is first movable away from said core and said first mold member to remove said second mold member out of a restraining position relative to a molded closure cap body portion having an internal thread thereon.

3. A mold according to claim 2 wherein said first mold member is in the form of an ejector block which moves relative to said core to strip a molded closure cap from said core.

4. A mold according to claim 1 wherein said first mold member is in the form of an ejector block which moves relative to said core to strip a molded closure cap from said core.

5. A mold according to claim 1 wherein there is a mold cavity extension between said first and second mold members for defining a cover panel integral with the remainder of the molded closure cap.

6. A mold according to claim 5 wherein said cavity extension is primarily formed in said second mold member in opposition to said parting line.

7. A mold according to claim 5 wherein said cavity extension is primarily formed in said second mold member in opposition to said parting line and adjacent to said first mold member one wall portion.

* * * * *